US011250035B2

(12) United States Patent
Kuo et al.

(10) Patent No.: US 11,250,035 B2
(45) Date of Patent: Feb. 15, 2022

(54) KNOWLEDGE GRAPH GENERATING APPARATUS, METHOD, AND NON-TRANSITORY COMPUTER READABLE STORAGE MEDIUM THEREOF

(71) Applicant: Institute For Information Industry, Taipei (TW)

(72) Inventors: Hsin-Yi Kuo, Taoyuan (TW); You-Cyuan Yang, Taichung (TW); Wen-Fa Huang, Taipei (TW); Wen-Nan Wang, Taipei (TW); Ping-I Chen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 468 days.

(21) Appl. No.: 16/206,844

(22) Filed: Nov. 30, 2018

(65) Prior Publication Data
US 2020/0133962 A1 Apr. 30, 2020

(30) Foreign Application Priority Data

Oct. 25, 2018 (TW) .................. 107137786

(51) Int. Cl.
*G06F 16/28* (2019.01)
*G06N 5/02* (2006.01)
(Continued)

(52) U.S. Cl.
CPC .......... *G06F 16/288* (2019.01); *G06F 16/906* (2019.01); *G06F 40/169* (2020.01);
(Continued)

(58) Field of Classification Search
CPC .... G06F 16/288; G06F 16/906; G06F 40/169; G06F 40/186; G06N 5/02
See application file for complete search history.

(56) References Cited

U.S. PATENT DOCUMENTS

| 2005/0022115 A1* | 1/2005 | Baumgartner ...... G06F 16/9535 715/205 |
| 2014/0201183 A1* | 7/2014 | Lin ..................... G06F 16/9535 707/706 |

(Continued)

FOREIGN PATENT DOCUMENTS

| CN | 102360368 B | 7/2014 |
| CN | 105574089 A | 5/2016 |

(Continued)

OTHER PUBLICATIONS

Office Action to the corresponding Taiwan Patent Application No. 107137786 rendered by the Taiwan Intellectual Property Office (TIPO) dated Aug. 8, 2019, 16 pages (including English translation).

*Primary Examiner* — Matthew J Ellis
(74) *Attorney, Agent, or Firm* — Birch, Stewart, Kolasch & Birch, LLP

(57) ABSTRACT

A knowledge graph generating apparatus, method and non-transitory computer readable storage medium thereof are provided. The apparatus marks an entity-relationship of the template of goods information in the template of webpage according to the operating signal and generates an extraction rule set, wherein the template of webpage is one of multiple goods webpages and has a template format. The apparatus extracts a plurality of first product information of the first goods webpages according to the extraction rule set, wherein the first goods webpages have the template format and are selected from the goods webpages. The apparatus generates a classified goods information result through a product information classification model, wherein the product information classification model is generated based on the first product information and the entity-relationship of the template of goods information. The apparatus converts (Continued)

the classified goods information result into several semantic triples to generate a knowledge graph.

17 Claims, 6 Drawing Sheets

(51) Int. Cl.
  *G06F 16/906* (2019.01)
  *G06F 40/169* (2020.01)
  *G06F 40/186* (2020.01)
  *G06F 40/30* (2020.01)
  *G06F 16/901* (2019.01)

(52) U.S. Cl.
  CPC ............ *G06F 40/186* (2020.01); *G06F 40/30* (2020.01); *G06N 5/02* (2013.01); *G06F 16/9024* (2019.01)

(56) References Cited

U.S. PATENT DOCUMENTS

| | | | |
|---|---|---|---|
| 2015/0095303 A1 | 4/2015 | Sonmez et al. | |
| 2015/0106157 A1* | 4/2015 | Chang | G06Q 30/0201 705/7.29 |
| 2015/0127565 A1* | 5/2015 | Chevalier | G06Q 30/00 705/319 |
| 2016/0371381 A1* | 12/2016 | Elassaad | G06F 16/285 |
| 2018/0082183 A1* | 3/2018 | Hertz | G06Q 10/10 |
| 2019/0057145 A1* | 2/2019 | Huang | G06N 20/00 |
| 2019/0287006 A1* | 9/2019 | Costabello | H04L 67/12 |
| 2019/0312869 A1* | 10/2019 | Han | G06F 16/9024 |

FOREIGN PATENT DOCUMENTS

| | | | |
|---|---|---|---|
| CN | 106156365 A | 11/2016 | |
| CN | 107665252 A | 2/2018 | |
| CN | WO-2018072563 A1 * | 4/2018 | ............ G06F 17/30 |
| CN | 108694208 A | 10/2018 | |
| TW | I442249 B | 6/2014 | |

* cited by examiner

| Entity | Relation | Attribute |
|---|---|---|
| X-type shoes | Applicable gender | Male |
| X-type shoes | Running type | Road running shoes |
| X-type shoes | Foot type | General arch |
| X-type shoes | Applicable foot | General |
| X-type shoes | Function | Stable/supporting |

```
<div class="sub_main_topic equipment-title"><h3> Specification </h3></div>
<div id='equipment_info' class="main_content equipment-box">
  <div class="information_box">
    <div class="equipement_basic_information eq-basic-info">
      <div class="basic_info_item basic-info-item">
        <div class="basic_info_title eq-info-ti1"> Applicable gender </div>
        <div class="basic_info_content basic-info-type"> Male </div>
      </div>
      <div class="basic_info_item basic-info-item">
        <div class="basic_info_title eq-info-ti1"> Running type </div>
        <div class="basic_info_content basic-info-type"> Road running shoes </div>
      </div>
      <div class="basic_info_item basic-info-item">
        <div class="basic_info_title eq-info-ti1"> Foot type </div>
        <div class="basic_info_content basic-info-type"> General arch </div>
      </div>
    </div>
  </div>
</div>
```

Y-type shoes

Applicable gender  Male

Running type  Cross-country shoes

Foot type  High arch, general arch, low arch

Applicable foot  General, underpronation

Function  Shock-proof/buffering

......

Z-type shoes

Applicable gender  Female

Running type  Barefoot shoes

Foot type  General arch

Applicable foot  General

Function  Barefoot

FIG. 4A

KNOWLEDGE GRAPH GENERATING APPARATUS, METHOD, AND NON-TRANSITORY COMPUTER READABLE STORAGE MEDIUM THEREOF

PRIORITY

This application claims priority to Taiwan Patent Application No. 107137786 filed on Oct. 25, 2018, which is hereby incorporated by reference in its entirety.

FIELD

The present invention relates to a knowledge graph generating apparatus, method and non-transitory computer readable storage medium thereof. Specifically, the present invention relates to a knowledge graph generating apparatus, method and non-transitory computer readable storage medium thereof, which automatically convert the goods webpage information into a knowledge graph based on a template format.

BACKGROUND

With the rapid development of artificial intelligence, relevant services such as intelligent question-answering systems or virtual assistant agent (e.g., chatbots) have gradually found wide application in various fields, and these systems simulate human dialogues to achieve the purpose of providing various services (e.g., acquiring information, answering product-related problems, recommending products meeting requirements or the like) depending on requirements of users.

All of these intelligent question-answering systems need to establish a background knowledge base (e.g., a question-answering corpus or a knowledge graph) in advance to achieve the purpose of responding relevant information quickly and accurately. However, the establishment of the knowledge graph is quite time and labor-consuming. For common manufacturers or enterprises, although they have massive goods webpage information (which usually has a semi-structured form), an efficient method of converting the semi-structured form into a structured form is absent so that a corresponding knowledge graph is hard to be formed from the goods webpage data. In this case, the content of the goods webpage information cannot be used efficiently, or cannot serve as the basic data of the intelligent question-answering systems.

Accordingly, an urgent need exists in the art to efficiently generate a corresponding knowledge graph based on webpage information.

SUMMARY

Provided are a knowledge graph generating apparatus, method and non-transitory computer readable storage medium thereof.

The knowledge graph generating apparatus can comprise a network interface, an operating interface and a processor, and the processor is electrically connected to the network interface and the operating interface. The network interface is configured to connect to a plurality of goods webpages. The operating interface is configured to generate an operating signal. The processor can be is configured to perform the following operations:
(a) annotating an entity-relationship of a piece of template of goods information in a template of webpage according to the operating signal and generating a first extraction rule set, wherein the template of webpage is one of the goods webpages and the template of webpage has a template format;
(b) connecting to a plurality of first goods webpages through the network interface, and extracting a plurality of pieces of first product information of the first goods webpages according to the first extraction rule set, wherein the first goods webpages have the template format and the first goods webpages are selected from the goods webpages;
(c) generating a first classified goods information result through a product information classification model, wherein the product information classification model is generated based on the first product information and the entity-relationship of the template of goods information; and
(d) converting the first classified goods information result into a plurality of semantic triples to generate a knowledge graph.

A knowledge graph generating method is adapted for use in a knowledge graph generating apparatus for generating an operating signal. The knowledge graph generating method is performed by the knowledge graph generating apparatus and can comprise the following steps:
(a) annotating an entity-relationship of a piece of template of goods information in a template of webpage according to the operating signal and generating a first extraction rule set, wherein the template of webpage is one of a plurality of goods webpages and the template of webpage has a template format;
(b) extracting a plurality of pieces of first product information of a plurality of first goods webpages according to the first extraction rule set, wherein the first goods webpages have the template format and the first goods webpages are selected from the goods webpages;
(c) generating a first classified goods information result through a product information classification model, wherein the product information classification model is generated based on the first product information and the entity-relationship of the template of goods information; and
(d) converting the first classified goods information result into a plurality of semantic triples to generate a knowledge graph.

A non-transitory computer readable storage medium can have a computer program stored therein. The computer program can execute a knowledge graph generating method after being loaded into an electronic device. The knowledge graph generating method can comprise the following steps:
(a) annotating an entity-relationship of a piece of template of goods information in a template of webpage according to an operating signal and generating a first extraction rule set, wherein the template of webpage is one of a plurality of goods webpages and the template of webpage has a template format;
(b) extracting a plurality of pieces of first product information of a plurality of first goods webpages according to the first extraction rule set, wherein the first goods webpages have the template format and the first goods webpages are selected from the goods webpages;
(c) generating a first classified goods information result through a product information classification model, wherein the product information classification model is generated based on the first product information and the entity-relationship of the template of goods information; and (d) converting the first classified goods information result into a plurality of semantic triples to generate a knowledge graph.

As can be known from the above descriptions, the knowledge graph generating apparatus, method and non-transitory computer readable storage medium thereof can generate an extraction rule set based on a template format by analyzing the template of webpage having the template format. Further speaking, since a plurality of other goods webpages also have the template format, the the product information of other goods webpages through the extraction rule set can be automatically extracted. Additionally, because the entity-relationship of a piece of template of goods information of the template of webpage is further ennotagted, a classified goods information result can be generated according to a product information classification model (generated based on the entity-relationship of a plurality of pieces of product information and the entity-relationship of the template of goods information). Finally, a knowledge graph can be generated by converting the classified goods information result into semantic triples (same as triple or triplestore). Moreover, an extraction rule model can be established according to a plurality of template formats, and further update the knowledge graph when the goods webpage is updated. By reducing the labor cost of establishing the knowledge graph, the technology provided herein can efficiently generate the knowledge graph of multiple webpages as the basic data of the intelligent question-answering systems, thereby solving the problem that the conventional establishment of the knowledge graph is time and labor-consuming.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 3 is a schematic view depicting a webpage source code of the template of webpage;

FIG. 4A is a schematic view depicting a plurality of goods webpages;

DETAILED DESCRIPTION

In the following description, a knowledge graph generating apparatus, method and computer program product thereof will be explained with reference to certain example embodiments thereof. However, these example embodiments are not intended to limit the present invention to any specific example, embodiment, environment, applications or implementations described in these example embodiments. Therefore, description of these example embodiments is only for purpose of illustration rather than to limit the scope of the present invention. It shall be appreciated that, in the following embodiments and the attached drawings, elements unrelated to the present invention are omitted from depiction.

Figure 1:
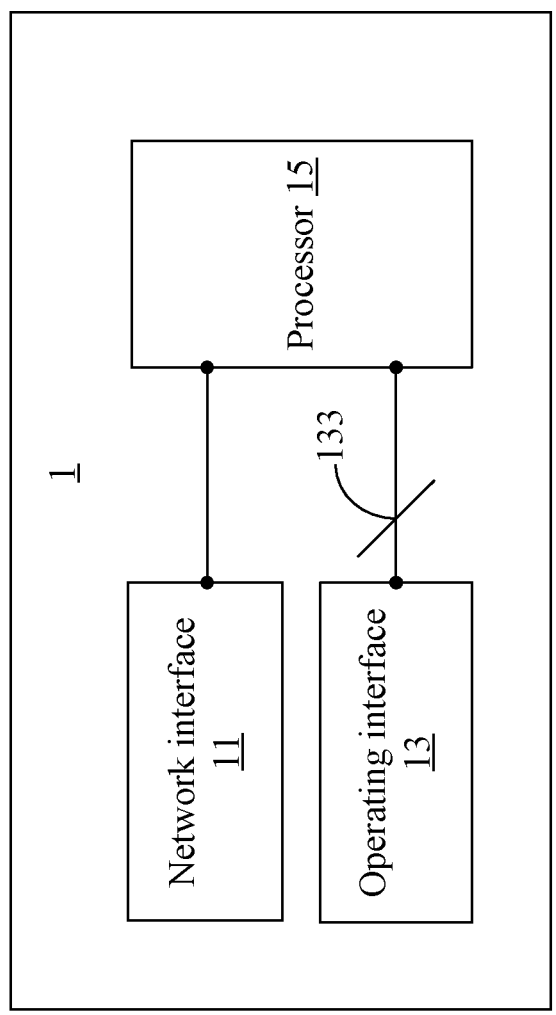
FIG. 1 is a schematic architectural view depicting a knowledge graph generating apparatus according to a first embodiment.

A first embodiment of the present invention is a knowledge graph generating apparatus 1, and a schematic architectural view thereof is depicted in FIG. 1. The knowledge graph generating apparatus 1 comprises a network interface 11, an operating interface 13 and a processor 15, and the processor 15 is electrically connected to the network interface 11 and the operating interface 13. The network interface 11 is an interface connected to the network or any of other interfaces that can be connected to the network and well known by those of ordinary skill in the art. The operating interface 13 is an input interface or any of other interfaces that are capable of receiving the input signal and generating the operating signal and well known by those of ordinary skill in the art. The processor 15 may be one of various processors, central processing units (CPUs), microprocessors, or any other computing devices well known to those of ordinary skill in the art. It shall be appreciated that, in other embodiments of the present invention, the operating interface 13 may be disposed outside the knowledge graph generating apparatus 1.

In this embodiment, the processor 15 first takes a template of webpage having a template format (e.g., a webpage selected from a plurality of goods webpages) as a standard, and generates an extraction rule set based on the template format of the template of webpage. Because the goods webpages also have the template format, the extraction rule set will be used for subsequently extracting the product information of other goods webpages automatically (which will be described later). Additionally, the processor 15 further enables the template of goods information of the template of webpage to correspond to an entity-relationship respectively, and uses the entity-relationship of the template of goods information for subsequently annotating the product information of other goods webpages (which will be described later).

Specifically, the processor 15 receives an operating signal 133 from the operating interface 13, annotates an entity-relationship of a piece of template of goods information in a template of webpage according to the operating signal 133, and generates a first extraction rule set. The template of webpage is one of the plurality of goods webpages and the template of webpage has a template format. It shall be appreciated that, the template format of the present invention is semi-structured information, but which semi-structured form needs to be adopted by the template format is not limited in the present invention. Any template format related to the semi-structured information, e.g., a webpage table or a cascading style sheet (CSS) or webpage content patterns illustrating products and product related information, shall fall within the scope claimed by the present invention. In some embodiments, the entity-relationship at least contains an entity, a relation and at least one attribute, which corresponds to the relation, of the product information (e.g., template of goods information). Additionally, in some embodiments, the first extraction rule set is related to at least one category of the template format.

For ease of understanding, how this embodiment annotates an entity-relationship of a piece of template of goods information in a template of webpage will be detailed first (how to generate a first extraction rule set will be described later). Please refer to a specific exemplary example shown in FIG. 2A, FIG. 2B and FIG. 3, but the specific exemplary example is not intended to limit the scope of the present invention. In this specific exemplary example, an auction website has a plurality of goods webpages for shoes, and these goods webpages have a same template format (as shown in FIG. 3, a webpage source code 301 of a template of webpage 21 designed in the CSS format).

Figures 2A, 2B:
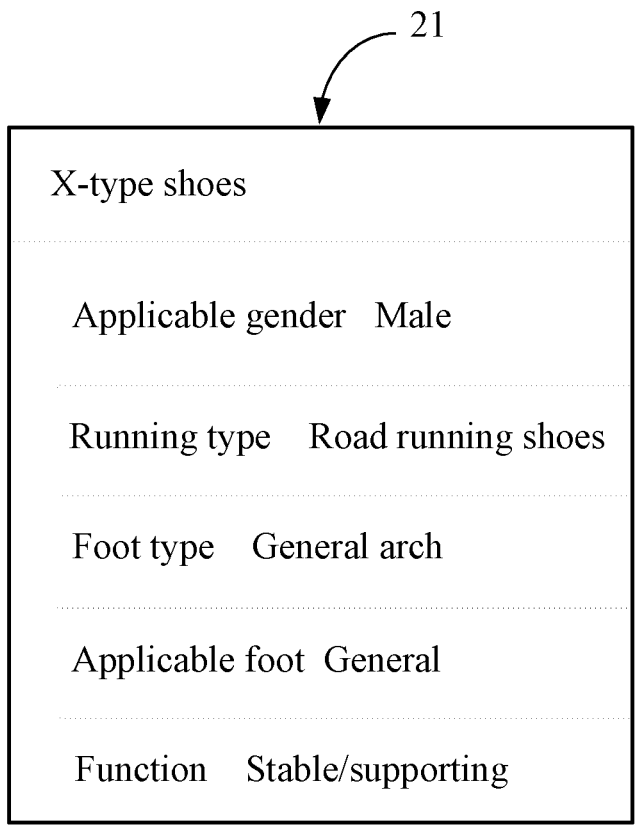
FIG. 2A is a schematic view depicting a template of webpage according to the first embodiment.
FIG. 2B is a schematic view depicting an entity-relationship of information on the template of webpage according to the first embodiment.

As shown in FIG. 2A, the template of webpage 21 is one of the goods webpages, and information related to X-type shoes is displayed. First, the user may classify through the operating interface 13 the information of the X-type shoes on the template of webpage 21 into an entity, a relation or an attribute, the operating interface 13 may generate an operating signal 133 according to the classified information and transmit the operating signal 133 to the processor 15, wherein the operating signal 133 carries the aforesaid classification result. As shown by the schematic view of the entity-relationship of FIG. 2B, the user classifies the information "X-type shoes" on the template of webpage 21 as an entity, classifies the information "applicable gender" as a relation, and classifies the information "male" as an attribute corresponding to the relation of "applicable gender". Similarly, corresponding to the entity of "X-type shoes", the user classifies the "Running type" as a relation and classifies the "road running shoes" as an attribute corresponding to the relation of "Running type" according to the information on the template of webpage 21. For other information on the template of webpage 21, the user may also perform classification one by one, and this will not be further described herein. Next, the processor 15 annotates the aforesaid entity-relationship of the template of goods information on the template of webpage 21 according to the received operating signal 133. It shall be appreciated that, in some embodiments, the knowledge graph generating apparatus 1 may also receive an operating signal from the outside to mark the entity-relationship of the template of goods information.

How the processor 15 generates the extraction rule set according to the operating signal 133 will be described hereinafter. FIG. 3 shows the webpage source code 301 of the template of webpage 21 designed in the CSS format, which displays categories (e.g., by the class names) corresponding to various fields. After the operating signal 133 transmitted from the operating interface 13 is received by the processor 15, the processor 15 finds at least one category (e.g., by the class name) and the corresponding annotated content in the source code 301, thereby generating the first extraction rule set. For example, as shown in the part enclosed by the dotted line of FIG. 3, the user annotates a block of which the class name is "equipment_basic_information eq-basic-info" as "product specification", and annotates a block of which the class name is "basic_info_item basic-info-item" as "description of product specification". It shall be appreciated that, this is only for purpose of illustration rather than for limiting the scope of the present invention, and the user may also annotate different blocks of the webpage according to different requirements or categories. Because the goods webpages also have the template format, during the subsequent processing of these goods webpages, the processor 15 can extract corresponding information on the goods webpages according to the categories (e.g., by the class name), and perform classification on the extracted product contents according to the annotated contents (e.g., whether the extracted contents belong to "product specification" or "description of product specification" or the like).

Thereafter, the processor 15 connects to other goods webpages through the network interface 11. Because other goods webpages also have the template format, the processor 15 may extract a plurality of pieces of first product information on other goods webpages according to the first extraction rule set. Next, the processor 15 generates a first classified goods information result through a product information classification model, and the product information classification model is generated based on the first product information and the entity-relationship of the template of goods information. It shall be appreciated that, the present invention does not make limitation that the product information classification model must be generated by the knowledge graph generating apparatus 1 itself, and an established product information classification model may also be received from the outside.

Specifically, the product information classification model may generate the first classified goods information result according to the following operation. First, the processor (which may be an internal processor 15 or an external processor) makes a word segmentation according to the aforesaid product information extracted on the goods webpages and then generates a word segmentation result. It shall be appreciated that, the word segmentation may comprise a word similarity analysis which may be implemented through algorithms such as Best Match 25 (BM25), Term frequency-inverse document frequency (TF/IDF) or the like, and it may further comprise operations such as de-noising, sentence segmentation, word segmentation or the like. Thereafter, a relation result is extracted according to the entity-relationship of the template of goods information and the word segmentation result, and the entity-relationship is annotated for the word segmentation result through the relation result. Finally, the first classified goods information result is generated according to the word segmentation result for which the entity-relationship has been annotated. It shall be appreciated that, details of the word segmentation, contents of the relation result and the classification of the word segmentation result are not the key points of the present invention and shall be appreciated by those of ordinary skill in the art, and thus will not be further described herein.

It shall be appreciated that, terms in different goods webpage information may be inconsistent (e.g., foot type, volume, size or the like). Therefore, in the training stage, the product information classification model may perform training through a large amount of congeneric products for which the entity-relationship has been annotated (e.g., the product information extracted from the first goods webpages), and feed the result back according to the generated classified goods information result for training and integrating, thereby solving the problem of inconsistent terms in the information. In this way, through the relation result of the product information classification model, the accuracy in annotating the entity-relationship can be improved. How to train the product information classification model shall be appreciated by those of ordinary skill in the art, and thus will not be further described herein.

Figure 4B:
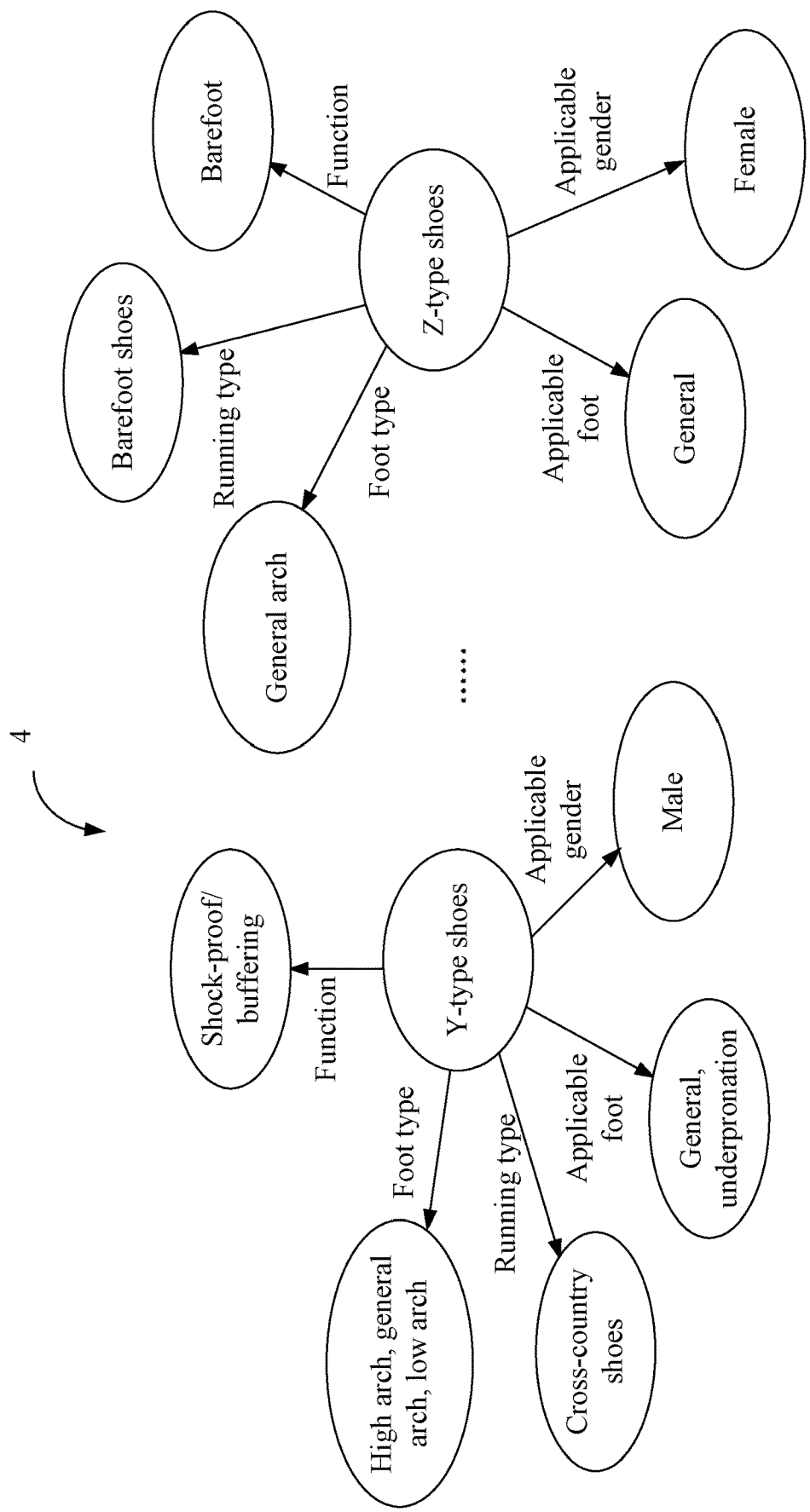
FIG. 4B is a schematic view depicting a knowledge graph generated according to the goods webpages of FIG. 4A.

Finally, the processor 15 converts the first classified goods information result into a plurality of semantic triples (i.e., triple or triplestore, data presented in the order of entity, relation and attribute) to generate a knowledge graph. Please refer to a schematic view of a knowledge graph 4 of FIG. 4B, which illustrates a knowledge graph generated according to the product information on the goods webpages of FIG. 4A. It shall be appreciated that, FIG. 4B is only for the purpose of illustrating the entity-relationship of the content of the knowledge graph rather than for limiting the scope of the present invention. Knowledge graphs stored in the conventional way and represented in various patterns all fall within the scope claimed by the present invention, and contents of these knowledge graphs shall be appreciated by those of ordinary skill in the art, and thus will not be further described herein. Moreover, a goods webpage may have multiple knowledge graphs according to differences of the information, and the way to generate the multiple knowledge graphs and the contents thereof shall be appreciated by those of ordinary skill in the art, and thus will not be further described herein.

In some embodiments, the processor 15 further extracts a piece of second product information of a second goods webpage according to the first extraction rule set, wherein the second goods webpage has the template format. In these embodiments, a second classified goods information result can be generated through the product information classification model by adopting the technology described in the first embodiment, wherein the second classified goods information result indicates the entity-relationship of the second product information. Finally, the knowledge graph is updated according to the second classified goods information result.

In some embodiments, the processor 15 may further generate an extraction rule model according to a plurality of template of webpages having different template formats (e.g., goods webpages from different auction websites). Specifically, the processor 15 annotates an entity-relationship of a second product in a second template of webpage according to a second operating signal and generates a second extraction rule set, wherein the second template of webpage is one of the plurality of goods webpages and has a second template format. The processor 15 generates an extraction rule model according to the first extraction rule set and the second extraction rule set. Therefore, when the processor 15 receives the goods webpages having different template formats, the processor 15 may select a suitable extraction rule set according to the extraction rule model to extract the product information of the goods webpages.

Moreover, in some embodiments, the processor 15 re-extracts the first goods webpages according to the first extraction rule set to obtain updated first product information when there is an update version of the first goods webpages. Next, the processor 15 generates an updated first classified goods information result through the product information classification model. Thereafter, the processor 15 updates the knowledge graph according to the updated first classified goods information result.

As can be known from the above descriptions, the knowledge graph generating apparatus 1 generates an extraction rule set based on a template format by analyzing the template of webpage having the template format. For a plurality of other goods webpages which also have the template format, the knowledge graph generating apparatus 1 can automatically extract the product information of other goods webpages through the extraction rule set. Additionally, because the knowledge graph generating apparatus 1 further annotates an entity-relationship of a piece of template of goods information of the template of webpage, a classified goods information result can be generated by the knowledge graph generating apparatus 1 according to a product information classification model (generated based on the entity-relationship of a plurality of pieces of product information and the entity-relationship of the template of goods information). Finally, the knowledge graph generating apparatus 1 generates a knowledge graph by converting the classified goods information result into semantic triples. Moreover, the knowledge graph generating apparatus 1 may also establish an extraction rule model according to a plurality of template formats, and further update the knowledge graph when the goods webpage is updated. By reducing the labor cost of establishing the knowledge graph, the technology provided by the present invention can efficiently generate the knowledge graph of multiple webpages as the basic data of the intelligent question-answering systems, thereby solving the problem that the conventional establishment of the knowledge graph is time and labor-consuming.

Figure 5:
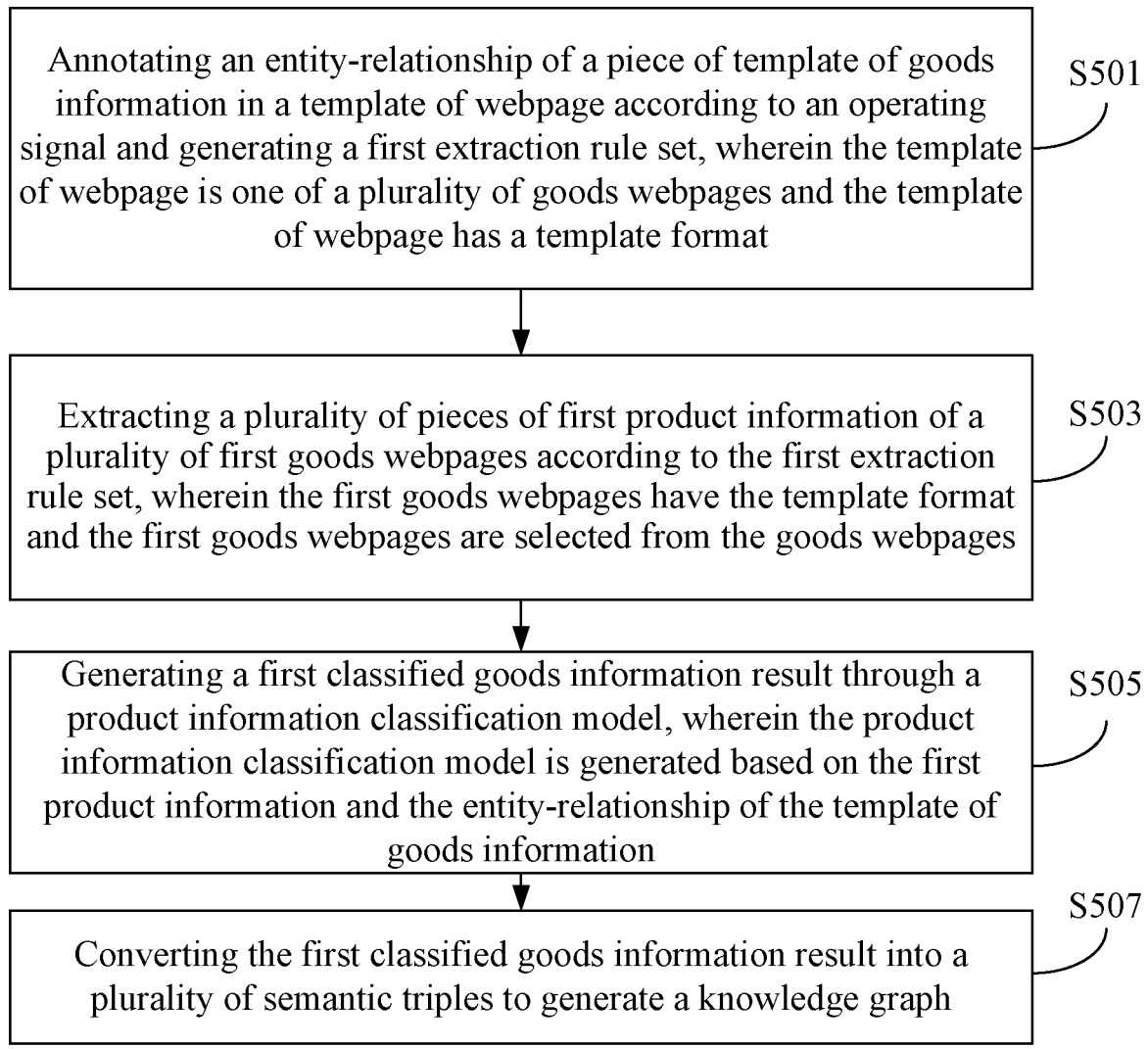
FIG. 5 is a flowchart diagram of a knowledge graph generating method according to a second embodiment.

A second embodiment of the present invention is a knowledge graph generating method, and a flowchart diagram thereof is depicted in FIG. 5. The knowledge graph generating method is adapted for use in an electronic apparatus, e.g., the knowledge graph generating apparatus 1 described in the first embodiment. The knowledge graph generating method generates the knowledge graph through steps S501 to S507.

First, in step S501, the electronic apparatus annotates an entity-relationship of a piece of template of goods information in a template of webpage according to an operating signal and generates a first extraction rule set, wherein the template of webpage is one of a plurality of goods webpages and the template of webpage has a template format. It shall be appreciated that, the template format of the present invention is semi-structured information, but which semi-structured form needs to be adopted by the template format is not limited in the present invention. Any template format related to the semi-structured information, e.g., a webpage table or a cascading style sheet (CSS), shall fall within the scope claimed by the present invention. In some embodiments, the entity-relationship at least contains an entity, a relation and at least one attribute, which corresponds to the relation, of the product information (e.g. template of goods information). Additionally, in some embodiments, the first extraction rule set is related to at least one category of the template format.

Next, in step S503, the electronic apparatus extracts a plurality of pieces of first product information of a plurality of first goods webpages according to the first extraction rule set, wherein the first goods webpages have the template format and the first goods webpages are selected from the goods webpages.

Thereafter, in step S505, the electronic apparatus generates a first classified goods information result through a product information classification model, wherein the product information classification model is generated based on the first product information and the entity-relationship of the template of goods information. In some embodiments, the step S505 may comprise the following steps: making a word segmentation according to the first product information to generate a word segmentation result; and extracting a relation result according to the entity-relationship of the template of goods information and the word segmentation result to generate the first classified goods information result, wherein the first classified goods information result indicates the entity-relationship of the first product information.

Thereafter, in step S507, the electronic apparatus converts the first classified goods information result into a plurality of semantic triples (same as triple or triplestore) to generate a knowledge graph. It shall be appreciated that, a goods webpage may have multiple knowledge graphs according to differences of the information, and the way to generate the multiple knowledge graphs and the contents thereof shall be appreciated by those of ordinary skill in the art, and thus will not be further described herein.

In some embodiments, the knowledge graph generating method further comprises the following step: extracting a piece of second product information of a second goods webpage according to the first extraction rule set, wherein the second goods webpage has the template format. A second classified goods information result is generated through the product information classification model, wherein the second classified goods information result indicates the entity-relationship of the second product information. The knowledge graph is updated according to the second classified goods information result.

In some embodiments, the knowledge graph generating method further comprises the following step: annotating an entity-relationship of a second product in a second template of webpage according to a second operating signal and generating a second extraction rule set, wherein the second template of webpage is one of the plurality of goods webpages and has a second template format. Next, the knowledge graph generating method further comprises a step of generating an extraction rule model according to the first extraction rule set and the second extraction rule set.

In some embodiments, the knowledge graph generating method further comprises the following step: re-extracting the first goods webpages according to the first extraction rule set to obtain updated first product information when there is an update version of the first goods webpages. An updated first classified goods information result is generated through the product information classification model. The knowledge graph is updated according to the updated first classified goods information result.

In addition to the aforesaid steps, the second embodiment can also execute all the operations and steps of the knowledge graph generating apparatus 1 set forth in the first embodiment, have the same functions and deliver the same technical effects as the first embodiment. How the second embodiment executes these operations and steps, has the same functions and delivers the same technical effects as the first embodiment will be readily appreciated by those of ordinary skill in the art based on the explanation of the first embodiment, and thus will not be further described herein.

The knowledge graph generating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the knowledge graph generating apparatus 1), the computer program executes the knowledge graph generating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that, in the specification and the claims of the present invention, some words (including: extraction rule set, goods webpage, product information, classified goods information result, template of webpage and template format) are preceded by terms such as "first" or "second", and these terms of "first" and "second" are only used to distinguish these different words.

According to the above descriptions, the knowledge graph generating technology (at least including the apparatus, method and computer program product thereof) provided by the present invention generates an extraction rule based on a template format by analyzing the template of webpage having the template format. Since a plurality of other goods webpages also have the template format, the knowledge graph generating technology provided by the present invention can automatically extract the product information of other goods webpages through the extraction rule. Additionally, because the knowledge graph generating technology provided by the present invention further annotates an entity-relationship of a piece of template of goods information of the template of webpage, a classified goods information result can be generated according to a product information classification model (generated based on the entity-relationship of a plurality of pieces of product information and the entity-relationship of the template of goods information). Finally, the knowledge graph generating technology provided by the present invention generates a knowledge graph by converting the classified goods information result into semantic triples. Moreover, the knowledge graph generating technology provided by the present invention may also establish an extraction rule model according to a plurality of template formats, and further update the knowledge graph when the goods webpage is updated. By reducing the labor cost of establishing the knowledge graph, the knowledge graph generating technology provided by the present invention can efficiently generate the knowledge graph of multiple webpages as the basic data of the intelligent question-answering systems, thereby solving the problem that the conventional establishment of the knowledge graph is time and labor-consuming.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A knowledge graph generating apparatus, comprising:
a network interface, being configured to connect to a plurality of goods webpages;
an operating interface, being configured to generate an operating signal; and
a processor, being electrically connected to the network interface and the operating interface and configured to perform the following operations:
(a) annotating an entity-relationship of a piece of template of goods information in a template of webpage according to the operating signal and generating a first extraction rule set, wherein the template of webpage is one of the goods webpages and the template of webpage has a template format;
(b) connecting to a plurality of first goods webpages through the network interface, and extracting a plurality of pieces of first product information of the first goods webpages according to the first extraction rule set, wherein the first goods webpages have the template format and the first goods webpages are selected from the goods webpages;
(c) generating a first classified goods information result through a product information classification model, wherein the product information classification model is generated based on the first product information and the entity-relationship of the template of goods information;
wherein the product information classification model comprises the following operations:
making a word segmentation according to the first product information to generate a word segmentation result; and extracting a relation result according to the entity-relationship of the template of goods information and the word segmentation result to generate the first classified goods information result, wherein the first classified goods information result indicates the entity-relationship of the first product information; and (d) converting the first classified goods information result into a plurality of semantic triples to generate a knowledge graph.

2. The knowledge graph generating apparatus of claim 1, wherein the template format is a webpage table or a Cascading Style Sheet (CSS).

3. The knowledge graph generating apparatus of claim 1, wherein the first extraction rule set is related to at least one category of the template format.

4. The knowledge graph generating apparatus of claim 1, wherein the entity-relationship at least contains an entity, a relation and at least one attribute corresponding to the relation, of the template of goods information.

5. The knowledge graph generating apparatus of claim 1, wherein the processor further executes the following operations:

extracting a piece of second product information of a second goods webpage according to the first extraction rule set, wherein the second goods webpage has the template format;

generating a second classified goods information result through the product information classification model, wherein the second classified goods information result indicates the entity-relationship of the second product information; and updating the knowledge graph according to the second classified goods information result.

6. The knowledge graph generating apparatus of claim 1, wherein the processor further executes the following operations:

annotating an entity-relationship of a second product in a second template of webpage according to a second operating signal and generating a second extraction rule set, wherein the second template of webpage is one of the goods webpages and the second template of webpage has a second template format; and generating an extraction rule model according to the first extraction rule set and the second extraction rule set.

7. The knowledge graph generating apparatus of claim 1, wherein the processor further executes the following operations:

re-extracting the first goods webpages according to the first extraction rule set to obtain updated first product information when there is an update version of the first goods webpages;

generating an updated first classified goods information result through the product information classification model; and updating the knowledge graph according to the updated first classified goods information result.

8. A knowledge graph generating method for use in a knowledge graph generating apparatus, the knowledge graph generating apparatus being configured to generate an operating signal, the knowledge graph generating method being performed by the knowledge graph generating apparatus and comprising:

(a) annotating an entity-relationship of a piece of template of goods information in a template of webpage according to the operating signal and generating a first extraction rule set, wherein the template of webpage is one of a plurality of goods webpages and the template of webpage has a template format;

(b) extracting a plurality of pieces of first product information of a plurality of first goods webpages according to the first extraction rule set, wherein the first goods webpages have the template format and the first goods webpages are selected from the goods webpages;

(c) generating a first classified goods information result through a product information classification model, wherein the product information classification model is generated based on the first product information and the entity-relationship of the template of goods information;

wherein the step of generating the first classified goods information result through the product information classification model comprises:

making a word segmentation according to the first product information to generate a word segmentation result; and extracting a relation result according to the entity-relationship of the template of goods information and the word segmentation result to generate the first classified goods information result, wherein the first classified goods information result indicates the entity-relationship of the first product information; and (d) converting the first classified goods information result into a plurality of semantic triples to generate a knowledge graph.

9. The knowledge graph generating method of claim 8, wherein the template format is a webpage table or a Cascading Style Sheet (CSS).

10. The knowledge graph generating method of claim 8, wherein the first extraction rule set is related to at least one category of the template format.

11. The knowledge graph generating method of claim 8, wherein the entity-relationship at least contains an entity, a relation and at least one attribute corresponding to the relation, of the template of goods information.

12. The knowledge graph generating method of claim 8, further comprising:

extracting a piece of second product information of a second goods webpage according to the first extraction rule set, wherein the second goods webpage has the template format;

generating a second classified goods information result through the product information classification model, wherein the second classified goods information result indicates the entity-relationship of the second product information; and updating the knowledge graph according to the second classified goods information result.

13. The knowledge graph generating method of claim 8, further comprising:

annotating an entity-relationship of a second product in a second template of webpage according to a second operating signal and generating a second extraction rule set, wherein the second template of webpage is one of the plurality of goods webpages and the second template of webpage has a second template format; and generating an extraction rule model according to the first extraction rule set and the second extraction rule set.

14. The knowledge graph generating method of claim 8, further comprising:

re-extracting the first goods webpages according to the first extraction rule set to obtain updated first product information when there is an update version of the first goods webpages;

generating an updated first classified goods information result through the product information classification model; and updating the knowledge graph according to the updated first classified goods information result.

15. A non-transitory computer readable storage medium having a computer program stored therein, the computer program executing a knowledge graph generating method after being loaded into an electronic device, the knowledge graph generating method comprising:

(a) annotating an entity-relationship of a piece of template of goods information in a template of webpage according to an operating signal and generating a first extraction rule set, wherein the template of webpage is one of a plurality of goods webpages and the template of webpage has a template format;

(b) extracting a plurality of pieces of first product information of a plurality of first goods webpages according to the first extraction rule set, wherein the first goods webpages have the template format and the first goods webpages are selected from the goods webpages;

(c) generating a first classified goods information result through a product information classification model, wherein the product information classification model is generated based on the first product information and the entity-relationship of the template of goods information;

wherein the step of generating the first classified goods information result through the product information classification model comprises:

making a word segmentation according to the first product information to generate a word segmentation result; and extracting a relation result according to the entity-relationship of the template of goods information and the word segmentation result to generate the first classified goods information result, wherein the first classified goods information result indicates the entity-relationship of the first product information; and (d) converting the first classified goods information result into a plurality of semantic triples to generate a knowledge graph.

16. The non-transitory computer readable storage medium of claim 15, wherein the knowledge graph generating method further comprises:

extracting a piece of second product information of a second goods webpage according to the first extraction rule set, wherein the second goods webpage has the template format;

generating a second classified goods information result through the product information classification model, wherein the second classified goods information result indicates the entity-relationship of the second product information; and updating the knowledge graph according to the second classified goods information result.

17. The non-transitory computer readable storage medium of claim 15, wherein the knowledge graph generating method further comprises:

re-extracting the first goods webpages according to the first extraction rule set to obtain updated first product information when there is an update version of the first goods webpages;

generating an updated first classified goods information result through the product information classification model; and updating the knowledge graph according to the updated first classified goods information result.

* * * * *